(12) United States Patent
Amir et al.

(10) Patent No.: US 6,434,204 B1
(45) Date of Patent: Aug. 13, 2002

(54) METHOD AND SYSTEM FOR DC OFFSET CORRECTION OF A QUADRATURE MODULATED RF SIGNAL

(75) Inventors: Israel Amir, Princeton; Michael S. Heutmaker, Trenton; John Rolland Welch, Mt. Laurel, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/262,260

(22) Filed: Mar. 4, 1999

(51) Int. Cl.[7] .............................. H03D 1/04; H03D 1/06; H03K 5/01; H03K 6/04; H04L 1/00
(52) U.S. Cl. ........................................ 375/346; 375/226
(58) Field of Search ................................. 375/224, 226, 375/295, 296, 298, 316, 340, 346, 371

(56) References Cited

U.S. PATENT DOCUMENTS 4,250,458 A * 2/1981 Richmond et al. .......... 329/306
6,154,158 A * 11/2000 Walker ....................... 341/118

OTHER PUBLICATIONS

"Digital Techniques for Wideband Receivers" by James Tsui (1995), chapter 8, section 14, pp. 256–261.

* cited by examiner

*Primary Examiner*—Stephen Chin
*Assistant Examiner*—Lenny Jiang
(74) *Attorney, Agent, or Firm*—Woodbridge & Associates, P.C.; Richard C. Woodbridge

(57) ABSTRACT

The DC offset error of a quadrature modulated RF signal is corrected by introducing a specific trial offset correction value, D, into the DC offset correction circuits 3, 4 or 5 times, by measuring the carrier power resulting from each trial introduction, and by using the information to determine the DC offset correction components, $I_{cor}$ and $Q_{cor}$. According to an ideal case first embodiment, specific offset D is employed in three different measurement combinations to determine the correction factors $I_{cor}$ and $Q_{cor}$. According to an alternative embodiment, a fourth offset correction measurement, needed to estimate a single offset control scale factor, is used to account for an unknown power scale factor A. According to a second alternative embodiment, five offset correction measurements are used to account for separate offset control scale factors for the I and Q channels.

4 Claims, 3 Drawing Sheets

REFERENCE CONSTELLATION FOR π/4 DQPSK

REFERENCE CONSTELLATION FOR QPSK

EFFECT OF DC OFFSET ON π/4 DQPSK

EFFECT OF DC OFFSET ON QPSK

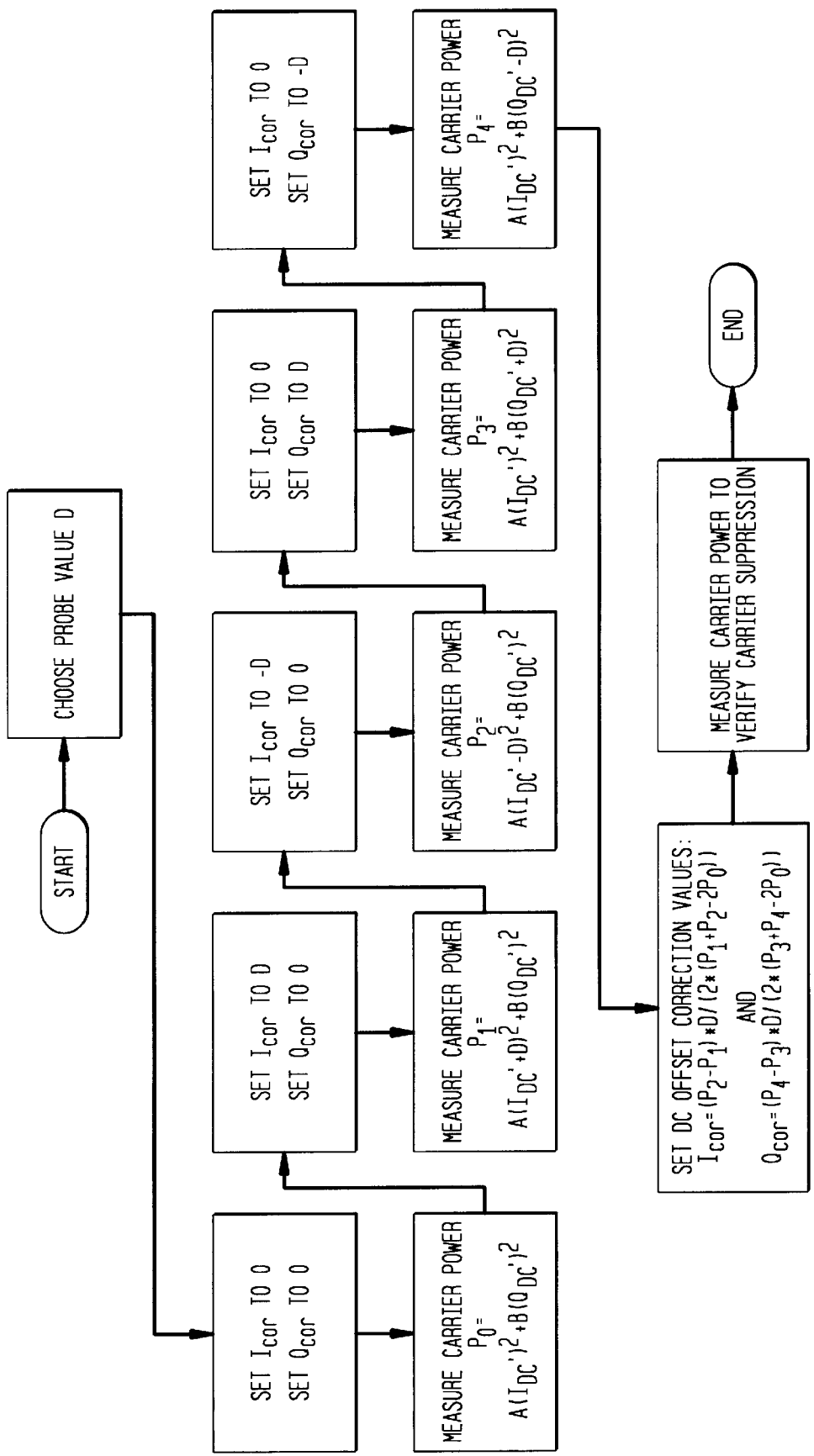

METHOD AND SYSTEM FOR DC OFFSET CORRECTION OF A QUADRATURE MODULATED RF SIGNAL

BACKGROUND OF THE INVENTION

1. Field of the Invention

The invention relates to a method for correcting the DC offset of a quadrature modulated RF signal.

2. Description of Related Art

Quadrature modulators are devices that are used in many digital wireless communication systems. They are used to form one signal containing a digital bit stream and a radio frequency carrier using in-phase (I) and quadrature (Q) input signals. The output is a modulated signal ready for transmission after amplification. In order to perform at their best, such modulators have to have the following three parameters (among others) under control:

a. amplitude imbalance—the I and Q channels must have equal amplitude gain;

b. quadrature error—deviation from the ideal 90° phase shift between the I and Q channels;

c. DC offset that is usually generated by the modulator itself and is a cause for degradation in carrier suppression. "Carrier suppression" is the leakage of the un-modulated RF signal through the modulator.

The cost of a quadrature modulator is largely determined by the quality of the foregoing parameters a–c. In order to reduce the cost of a transmitter, it is common to use lower cost modulators and actively correct the above parameters a–c in order to meet specifications.

Alternatively, it may be necessary to improve the performance of existing modulator hardware to allow accommodation of new standards, such as IS 136+. Accordingly, a means was needed to determine the extent to which a given quadrature modulator exhibited the foregoing parameters a–c and, if there are errors, to correct them quickly, preferably without time consuming trial and error search procedures.

The problems described above are generally related to the test and/or calibration of both base stations and terminals such as digital and phone transmitters.

In many practical cases, the prior art technique consisted primarily of trial and error. Many TDMA and CDMA transmitters have AC and DC I and Q inputs. A technician would typically apply a variety of offset signals, either manually or using a computer program, until all of the three parameters a–c were within acceptable limits. After that point, the transmitter calibration was complete. Unfortunately, the trial and error technique sometimes requires a large number of tests to bring an RF transmitter into alignment.

One example of a prior art correction technique is described in a book entitled "Digital Techniques for Wideband Receivers" by J. Tsui and is set forth in Chapter 8, Section 14, thereof and entitled "Digital Correction of IQ Channel Imbalance". This prior art technique uses an expression for time-domain modulator output as the starting point. By using a tone signal and comparing four measured time-domain samples to the modulator mathematical expression, it is possible to solve for the DC offset, IQ imbalance and quadrature error. This prior art method is best suited for receivers, which time-domain samples are likely to be the normal output data of the unit under test. It is not believed that this technique is especially well suited for transmitters.

In contrast, the present invention is advantageous for transmitters, where the output signal is an RF carrier. In this case, according to the prior art, specialized instrumentation, such as a vector signal analyzer or a down converter and digitizer, would be needed to acquire the time samples. According to the present invention, however, various different embodiments thereof use three, four or five measurements, but these measurements correspond to different I and Q combinations of the probe offset D. One particular advantage of the present invention, therefore, is that the measurements may be performed using the most common transmitter test instruments—the RF spectrum analyzer or RF power meter. Furthermore, two embodiments of the present invention include the scale factor(s) to convert between the measured data and the control variables.

It was in the context of the foregoing problem that the present invention arose.

SUMMARY OF THE INVENTION

Briefly described, the invention comprises a method for correcting DC offset in a quadrature modulated RF signal. According to the first embodiment, applicable under certain ideal circumstances, three measurements using known applied DC offsets are analyzed to find the DC offset corrections. According to a second embodiment, applicable under certain practical circumstances, a fourth measurement is made in order to determine an offset correction scale factor. The foregoing method is significantly more accurate and efficient than the prior art trial and error method.

The invention may be more fully understood with reference to the following drawings.

BRIEF DESCRIPTION OF THE DRAWINGS

FIG. 4 is a flow chart for one embodiment of the DC offset correction procedure.

DETAILED DESCRIPTION OF THE PREFERRED EMBODIMENT

During the course of this description, like numbers will be used to identify like elements according to the different figures that illustrate the invention.

Figure 1A:
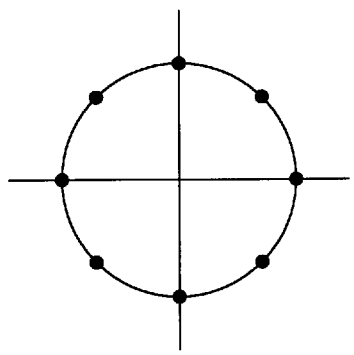
FIG. 1A is an eight point constellation for a $\pi/4$ DQPSK signal.
Figure 1B:
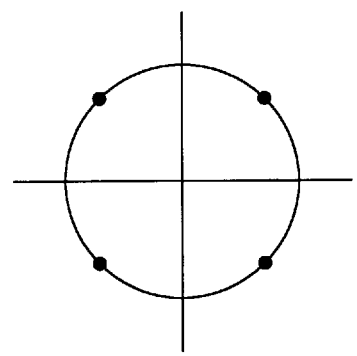
FIG. 1B is a four point reference constellation for a QPSK signal.

FIG. 1A illustrates an ideal quadrature modulated $\pi/4$ DQPSK signal comprising a constellation of eight undistorted signal points in the I and Q plane. While such a signal is described with reference to the preferred embodiments of the invention, nevertheless, the basic teaching could also apply to a QPSK signal comprising a constellation of four undistorted signal points in the I and Q plane as illustrated in FIG. 1B.

Figure 2A:
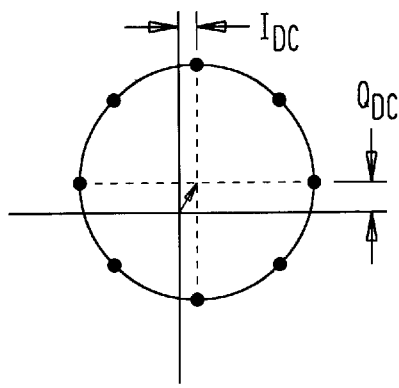
FIG. 2A illustrates the effect of DC offset on a $\pi/4$ DQPSK signal.
Figure 2B:
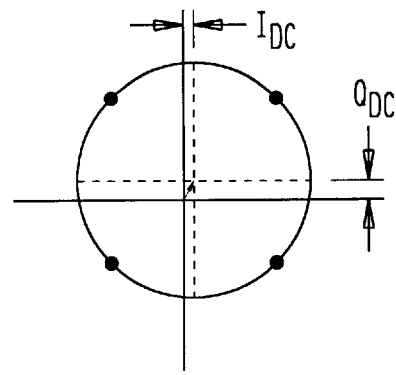
FIG. 2B illustrates the effect of DC offset on a QPSK signal.

FIG. 2A illustrates the same eight point $\pi/4$ DQPSK signal as illustrated in FIG. 1A but with an offset having components $I_{DC}$ and $Q_{DC}$. Again, the teachings of this invention could also be applied to a four point QPSK signal as illustrated in FIG. 2B.

FIG. 2A, therefore, effectively illustrates DC offset of an RF signal which does not exhibit the distortion of parameters a and b as described in the "Description of Related Art" but does show distortion of parameter c (DC offset). According to the best prior art known technique, trial and error were generally necessary in order to bring the DC offset back to an acceptable level.

It has been discovered, however, that with as few as three independent measurements, with predetermined perturbations of DC offsets, a modulator's DC offset can be calculated and corrected for. The method and system can be best understood by the following analysis.

In the absence of correction the output of a quadrature modulator for sinusoidal inputs and DC offset comprising components $I_{DC}$ and $Q_{DC}$ can be generally written as follows:

$$M_{out}=(I_{DC}+\sin \omega_m t) \cos(\omega_c t+\theta_c)+(Q_{DC}+\cos \omega_m t) \sin(\omega_c t+\theta_c) \quad (1)$$

where $I_{DC}$ and $Q_{DC}$ are the I and Q DC offsets, $\omega_m$, $\omega_c$ are the sinusoidal input and carrier frequencies and $\theta_c$ represents the carrier phase. Expanding equation (1) produces the following:

$$M_{out}=\cos \theta_c(\sin \omega_m t \cos \omega_c t+\cos \omega_m t \sin \omega_c t)-\sin \theta_c(\sin \omega_m t \sin \omega_c t-\cos \omega_m t \cos \omega_c t)+I_{DC} \cos(\omega_c t+\theta_c)+Q_{DC} \sin(\omega_c t+\theta_c)=\sin[(\omega_m+\omega_c)t+\theta_c]+I_{DC}\cos(\omega_c t+\theta_c)+Q_{DC}\sin(\omega_c t+\theta_c) \quad (2)$$

The carrier amplitude is then represented by the two rightmost terms in the above equation (2)

$$R_0 = \sqrt{I_{DC}^2 + Q_{DC}^2} \quad (3)$$

or, in terms of power, $$R_0^2 = I_{DC}^2 + Q_{DC}^2 \quad (4)$$

A. Correcting for $I_{DC}$ and $Q_{DC}$ when A=B=1

Figure 3:
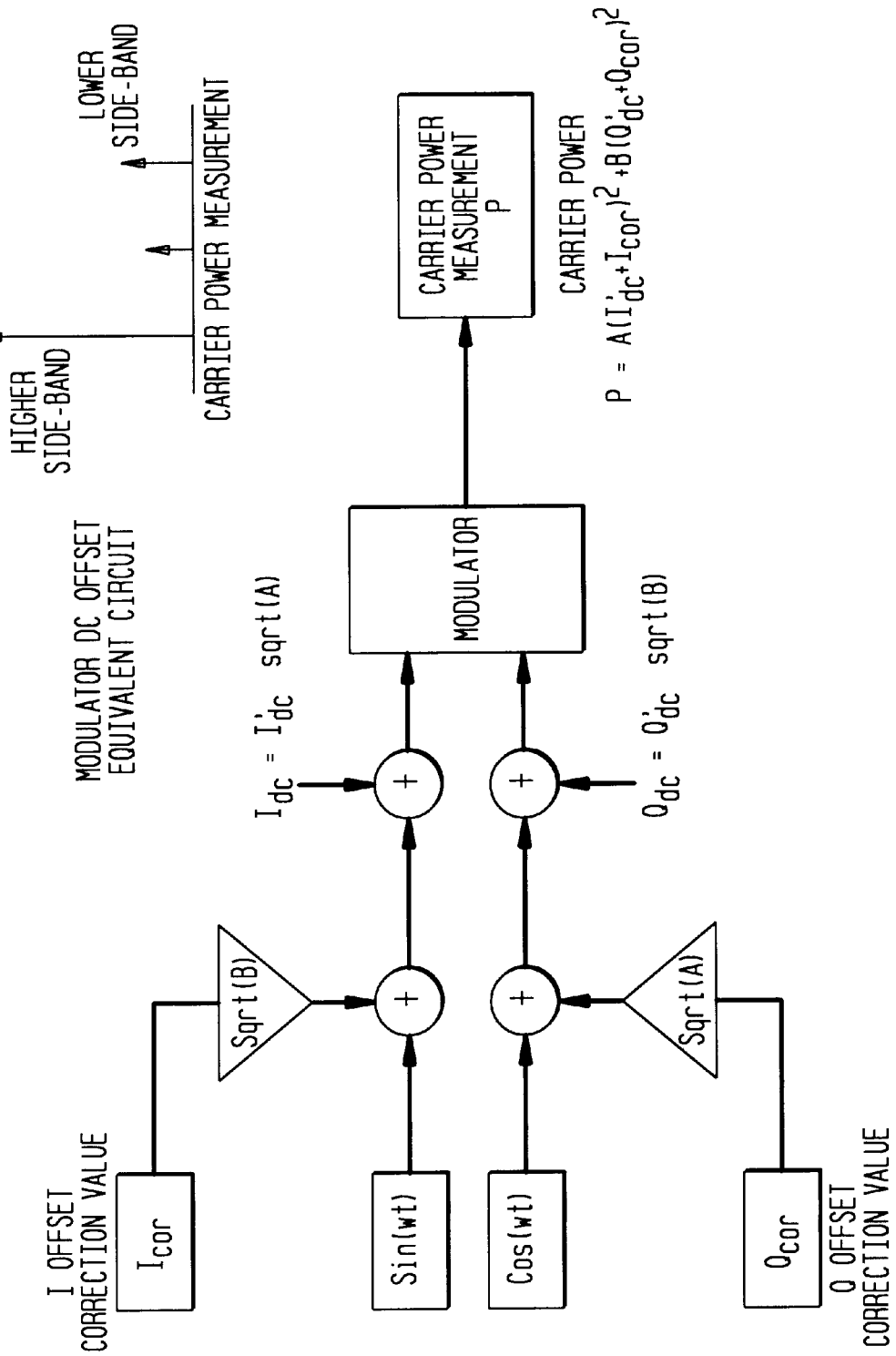
FIG. 3 is an equivalent circuit diagram for an IQ modulator with DC offset correction capability.

FIG. 3 is an equivalent circuit diagram for modulator DC offset adjustment. The actual source of DC offsets can be the modulator, the IQ D/A converters, or the offset correction circuits. For convenience a single pair of equivalent DC offset values, $I_{DC}$ and $Q_{DC}$, is specified and located at the inputs to the modulator to represent all sources of residual DC offset. The DC offset correction mechanism is shown as a pair of DC source registers, $I_{cor}$ and $Q_{cor}$, whose outputs are added to the I and Q modulation signals. $I_{cor}$ and $Q_{cor}$ are assumed to be linear and unbiased, in accordance with the assumption that all residual DC offsets are included in $I_{DC}$ and $Q_{DC}$. In this diagram it is assumed that there are also two unknown gain blocks, sqrt(A) and sqrt(B), in the modulator I and Q correction paths.

The problem is to cancel $I_{DC}$ and $Q_{DC}$, the equivalent residual DC offset values that add to the input to the modulator, using $I_{cor}$ and $Q_{cor}$. The sensitivities to the settings of $I_{cor}$ and $Q_{cor}$ are unknown, however, because of the unknown gain values, sqrt(A) and sqrt(B). To handle these uncertainties in the gain relationships $I'_{DC}=I_{DC}/\text{sqrt}(A)$ and $Q'_{DC}=Q_{DC}/\text{sqrt}(B)$ are defined, which are offset values referenced to the domain of the correction variables. In terms of these variables the output carrier power level is $$P=A(I_{cor}+I'_{DC})^2+B(Q_{cor}+Q'_{DC})^2 \quad (5)$$

The objective of the procedure is to estimate $I'_{DC}$ and $Q'_{DC}$ so that $I_{cor}=-I'_{DC}$ and $Q_{cor}=-Q'_{DC}$ may be set to eliminate the residual carrier power.

Specifically known offsets ±D are added to $I_{cor}$ and $Q_{cor}$ and three tests are conducted. The three resultant relationships (when A=B=1) are:

$$P_1=(I'_{DC}+D)^2+(Q'_{DC}+D)^2 \quad (6)$$

$$P_2=(I'_{DC}-D)^2+(Q'_{DC}+D)^2 \quad (7)$$

$$P_3=(I'_{DC}+D)^2+(Q'_{DC}-D)^2 \quad (8)$$

Solving these relationships for $I_{cor}$ and $Q_{cor}$ gives:

$$Q_{cor} = -Q'_{DC} = \frac{P_3 - P_1}{4D} \quad (9)$$

$$I_{cor} = -I'_{DC} = \frac{P_2 - P_1}{4D} \quad (10)$$

In view of the foregoing, it is clear that with as few as three tests with a known offset D, it is possible to determine correction values that will bring the DC offset of the constellation back to within acceptable limits.

B. Correcting for $I_{DC}$ and $Q_{DC}$ when A=B≠1

It has been determined that it may be necessary to identify the scale factors A and B in order to account for the unknown scale relationships between the set of DC offset correction variables and the measured carrier power. Those scale factors are implicitly set to 1 in the equations (6) through (10) given above, but must be estimated in order to cancel the DC offset in a practical calibration environment.

In the case where A=B, the scale factor applies to equations (4) through (8) above. The four required measurements for this case are set forth in equations (11) through (14) below:

$$P_0=A[I'_{DC}^2+Q'_{DC}^2] \quad (11)$$

$$P_1=A[(I'_{DC}+D)^2+(Q'_{DC}+D)^2] \quad (12)$$

$$P_2=A[(I'_{DC}-D)^2+(Q'_{DC}+D)^2] \quad (13)$$

$$P_3=A[(I'_{DC}+D)^2+(Q'_{DC}-D)^2] \quad (14)$$

where:

$I'_{DC}$ and $Q'_{DC}$ are the equivalent I and Q offset control variables, referred to the correction variable domain $P_0$ through $P_3$ are carrier power measures for particular sets of $I_{cor}$ and $Q_{cor}$ offset correction values, D is an experimental offset correction probe value, and A is the unknown control scale factor.

To solve for A, add $P_2$ to $P_3$ and expand to achieve:

$$P_2+P_3=2A(I'_{DC}^2+Q'_{DC}^2)+4AD^2 \quad (15)$$

Combining (11) and (15) and solving for A gives:

$$A=(P_2+P_3-2P_0)/4D^2 \quad (16)$$

Combining (12), (13) and (16) and solving for $I_{cor}=-I_{DC}$ gives:

$$I_{cor}=-I_{DC}=(P_2-P_1)D/(P_2+P_3-2P_0) \quad (17)$$

Combining (12), (14) and (16) and solving for $Q_{cor}=-Q_{DC}$ gives:

$$Q_{cor}=-Q_{DC}=(P_3-P_1)D/(P_2+P_3-2P_0) \quad (18)$$

B. Correcting for $I_{DC}$ and $Q_{DC}$ when A≠B

In a third, more general case where A≠B, five measurements are required to solve for the correction factors. In this case first set $I_{cor}=Q_{cor}=0$ and measure the output carrier power, $$P_0=AI'_{DC}^2+BQ'_{DC}^2 \quad (19)$$

Then perform four additional measurements:

$$P_1 = A(I'_{DC}+D)^2 + BQ'_{DC}{}^2 \qquad (20)$$

$$P_2 = A(I'_{DC}-D)^2 + BQ'_{DC}{}^2 \qquad (21)$$

$$P_3 = AI'_{DC}{}^2 + B(Q'_{DC}+D)^2 \qquad (22)$$

$$P_4 = AI'_{DC}{}^2 + B(Q'_{DC}-D)^2 \qquad (23)$$

where:

$I'_{DC}$ and $Q'_{DC}$ are the unknown I and Q residual offset values scaled in terms of the offset control variables, the P's are carrier power measures for particular sets of $I_{cor}$ and $Q_{cor}$ offset control settings, D is an experimental correction probe value introduced into $I_{cor}$ and $Q_{cor}$, and sqrt(A) and sqrt(B) are the unknown gains.

To solve for A, add $P_1$ to $P_2$ and expand to achieve:

$$P_1 + P_2 = 2A(I'_{DC}{}^2 + D^2) + 2BQ'_{DC}{}^2 \qquad (24)$$

Combining (19) and (24) gives:

$$A = (P_1 + P_2 - 2P_0)/2D^2 \qquad (25)$$

To solve for B, add $P_3$ to $P_4$ and expand to achieve:

$$P_3 + P_4 = 2AI'_{DC}{}^2 + 2B(Q'_{DC}{}^2 + D^2) \qquad (26)$$

Combining (19) and (26) gives:

$$B = (P_3 + P_4 - 2P_0)2D^2 \qquad (27)$$

To solve for $I'_{DC}$ subtract $P_2$ from $P_1$ and expand to achieve:

$$I'_{DC} = (P_1 - P_2)4AD \qquad (28)$$

Combining (25) and (28) gives $$I_{cor} = -I'_{DC} = (P_2 - P_1)D/(2(P_1 + P_2 - 2P_0)) \qquad (29)$$

To solve for $Q'_{DC}$ subtract $P_4$ from $P_3$ and expand to achieve:

$$Q'_{DC} = (P_3 - P_4)/4BD \qquad (30)$$

Combining (27) and (30) gives $$Q_{cor} = -Q'_{DC} = (P_4 - P_3)D/(2(P_3 + P_4 - 2P_0)) \qquad (31)$$

The flow chart of FIG. 4 summarizes the offset computation procedure for the general case in which A≠B. The other two cases are structured the same way, but the particular experimental correction settings and correction formulas are different as described in their corresponding procedure descriptions.

In summary, in order to quickly and efficiently determine the DC offset of a quadrature modulated signal, a technician, either manually or with a computer program, merely has to perform three, four or five relatively simple, and similar, tests, entering predetermined values into the transmitter DC offset correction circuits and, analyze the measured carrier power results, to determine the necessary DC offset correction factors $I_{cor}$ and $Q_{cor}$ so that the appropriate correction to the transmitters can be made.

While the invention has been described with reference to a preferred and two alternative embodiments thereof, it will be appreciated by those of ordinary skill in the art that modifications can be made to the steps of the method and components of the system without departing from the spirit and scope of the invention as a whole.

We claim:

1. A method for adjusting the DC offset controls for the correction circuit voltage values Icor and Qcor of a quadrature modulated RF signal produced by a radio transmitter having I and Q channels and having I and Q correction circuits, to cancel the residual DC offsets $I'_{DC}$ and $Q'_{DC}$ said method comprising the steps of:

(a) setting the I and Q correction circuit voltage values Icor and Qcor to a known offset voltage value D;
   (b) injecting said known offset voltage value D into said I and Q correction circuits in different combinations of positive and negative values of +D and −D;
   (c) measuring the RF carrier power output of said radio transmitter for each of said combinations of +D and −D;
   (d) determining new values for said correction circuit voltage values Icor and Qcor and,
   (e) setting said DC offset controls for said correction circuit voltage values Icor and Qcor on said radio transmitter for said I and Q channels at said new values determined in step (c), wherein said DC offsets $I'_{DC}$ and $Q'_{DC}$ for said I and Q signals are within a predetermined range.

2. The method of claim 1 wherein said new values of Icor and Qcor in step (c) are determined by the following steps:

(f) setting said DC offset controls of said radio transmitter for Icor to be equal to +D and Qcor to be equal to +D;
   (g) measuring the RF carrier power output $P_1$ of said radio transmitter;
   (h) setting said DC offset controls of said radio transmitter for Icor to be equal to −D and Qcor to be equal to +D;
   (i) measuring the RF carrier power output $P_2$ of said radio transmitter;
   (j) setting said DC offset controls of said radio transmitter for Icor to be equal to +D and Qcor to be equal to −D;
   (k) measuring the RF carrier power output $P_3$ of said radio transmitter;
   (l) determining said new value of correction voltage values Icor and Qcor according to the formulas:

$$Qcor = \frac{P_3 - P_1}{4D}$$

and $$Icor = \frac{P_2 - P_1}{4D}$$

where D is the value of the offset adjustment voltage from step (f).

3. The method of claim 1 modified for the case of an unknown correction scale factor A, wherein said new values of Icor and Qcor in step (c) are determined by the following steps:

(n) setting said DC offset controls of said radio transmitter for Icor to be equal to zero and Qcor to be equal to zero;
   (o) measuring the RF carrier power output $P_0$ of said radio transmitter;
   (p) setting said DC offset controls of said radio transmitter for Icor to be equal to +D and Qcor to be equal to +D;
   (q) measuring the RF carrier power output $P_1$ of said radio transmitter;

(r) setting said DC offset controls of said radio transmitter for Icor to be equal to −D and Qcor to be equal to +D;

(s) measuring the RF carrier power output $P_2$ of said radio transmitter;

(t) setting said DC offset controls of said radio transmitter for Icor to be equal to +D and Qcor to be equal to −D;

(u) measuring the RF carrier power output $P_3$ of said radio transmitter;

(v) determining said new value of correction voltage values Icor and Qcor according to the formulas:

$$Icor=(P_2-P_1)D/(P_2+P_3-2P_0)$$

and $$Qcor=(P_3-P_1)D/(P_2+P_3-2P_0)$$

where D is the value of the offset adjustment voltage from step (r).

4. The method of claim 1 modified for the case of unknown correction scale factors A and B wherein said new values of Icor and Qcor in step (c) are determined by the following steps:

(w) setting said DC offset controls of said radio transmitter for Icor to be equal to zero and Qcor to be equal to zero;

(x) measuring the RF carrier power output $P_0$ of said radio transmitter;

(y) setting said DC offset controls of said radio transmitter for Icor to be equal to +D and Qcor to be equal to zero;

(z) measuring the RF carrier power output $P_1$ of said radio transmitter;

(aa) setting said DC offset controls of said radio transmitter for Icor to be equal to −D and Qcor to be equal to zero;

(bb) measuring the RF carrier power output $P_2$ of said radio transmitter;

(cc) setting said DC offset controls of said radio transmitter for Icor to be equal to zero and Qcor to be equal to +D;

(dd) measuring the RF carrier power output $P_3$ of said radio transmitter;

(ff) setting said DC offset controls of said radio transmitter for Icor to be equal to zero and Qcor to be equal to −D;

(gg) measuring the RF carrier power output $P_4$ of said radio transmitter;

(hh) determining the new value of correction voltage values Icor and Qcor according to the formulas:

$$Icor=(P_2-P_1)D/(2(P_1+P_2-2P_0))$$

and $$Qcor=(P_4-P_3)D/(2(P_3+P_4-2P_0))$$

where D is the value of the offset adjustment voltage from step (y).

* * * * *